United States Patent
Kim

(10) Patent No.: US 9,712,480 B2
(45) Date of Patent: Jul. 18, 2017

(54) APPARATUS AND METHOD FOR REQUESTING AND TRANSFERRING CONTENTS

(71) Applicant: Samsung Electronics Co., Ltd., Suwon-si (KR)

(72) Inventor: Seo-young Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 105 days.

(21) Appl. No.: 14/331,940

(22) Filed: Jul. 15, 2014

(65) Prior Publication Data
US 2014/0337446 A1    Nov. 13, 2014

Related U.S. Application Data

(62) Division of application No. 12/819,669, filed on Jun. 21, 2010, now Pat. No. 8,819,167.

(30) Foreign Application Priority Data

Jul. 20, 2009  (KR) .................. 10-2009-0065995

(51) Int. Cl.
*H04L 12/58*        (2006.01)
*H04N 21/436*       (2011.01)
(Continued)

(52) U.S. Cl.
CPC .............. *H04L 51/32* (2013.01); *H04L 67/14* (2013.01); *H04L 67/141* (2013.01); *H04N 21/43615* (2013.01); *H04M 1/7253* (2013.01)

(58) Field of Classification Search
CPC .......... H04M 1/7253; H04N 21/43615; H04L 51/32; H04L 67/14; H04L 67/141
See application file for complete search history.

(56) References Cited

U.S. PATENT DOCUMENTS

| 7,779,095 B2 | 8/2010 | Hayashi |
| 2003/0081266 A1* | 5/2003 | Seaman .............. H04N 1/00416 358/474 |

(Continued)

FOREIGN PATENT DOCUMENTS

| JP | 2003-296239 | 10/2003 |
| JP | 2009-17540 A | 1/2009 |

(Continued)

OTHER PUBLICATIONS

Korean Office Action issued on Apr. 29, 2015, in counterpart Korean Application No. 10-2009-0065995 (3 pages in English, 4 pages in Korean).

(Continued)

*Primary Examiner* — Abdullahi E Salad
(74) *Attorney, Agent, or Firm* — NSIP Law

(57) ABSTRACT

Disclosed are an apparatus and method enabling a user to efficiently share contents. A user of an electronic device performs an image capturing by use of a camera, thereby generating an image capture event. According to the image capture event, the electronic device obtains address information of a content transferring apparatus and transfers a content requesting message to the content transferring apparatus having the address information. Upon reception of the content requesting message, the content transferring apparatus provides the electronic device with contents in execution and status information of the content. The electronic device uses the content and the status information to restore a status of the content which has been executed in the content transferring apparatus.

26 Claims, 6 Drawing Sheets

(51) Int. Cl.
*H04L 29/08* (2006.01)
*H04M 1/725* (2006.01)

(56) References Cited

U.S. PATENT DOCUMENTS

| | | |
|---|---|---|
| 2003/0131002 A1 | 7/2003 | Gennetten et al. |
| 2004/0212698 A1 | 10/2004 | Kito |
| 2005/0203991 A1 | 9/2005 | Kawamura et al. |
| 2006/0103762 A1 | 5/2006 | Ly et al. |
| 2007/0115346 A1 | 5/2007 | Kim et al. |
| 2007/0200922 A1 | 8/2007 | Ueno et al. |
| 2008/0056087 A1* | 3/2008 | Ejima ............... G11B 20/00086 369/53.44 |
| 2008/0197974 A1 | 8/2008 | Kim |
| 2008/0299901 A1 | 12/2008 | Kim et al. |
| 2008/0301307 A1* | 12/2008 | Son .................. G06F 17/30876 709/228 |
| 2009/0024721 A1 | 1/2009 | Kumamoto |
| 2009/0077162 A1* | 3/2009 | Nakatsuka ............ G11B 27/11 709/203 |
| 2009/0083646 A1 | 3/2009 | Lin et al. |
| 2009/0296149 A1 | 12/2009 | Kiyoshige |
| 2010/0149399 A1* | 6/2010 | Mukai .................... G01C 21/20 348/333.02 |
| 2010/0235428 A1* | 9/2010 | Kikkawa ................ H04N 5/765 709/203 |
| 2010/0283586 A1* | 11/2010 | Ikeda ................. H04N 1/00007 340/10.42 |

FOREIGN PATENT DOCUMENTS

| | | |
|---|---|---|
| KR | 10-2006-0025851 A | 3/2006 |
| KR | 10-2006-0086554 A | 8/2006 |
| KR | 10-2007-0013067 | 1/2007 |
| KR | 10-2007-0039248 | 4/2007 |
| KR | 10-0713511 B1 | 4/2007 |
| KR | 10-2007-0060617 | 6/2007 |
| KR | 10-2008-0019939 | 3/2008 |
| KR | 10-2008-0036374 | 4/2008 |
| KR | 10-2008-0105646 | 12/2008 |
| WO | WO 03/026302 | 3/2003 |

OTHER PUBLICATIONS

Korean Office Action issued on Sep. 28, 2016 in counterpart Korean Application No. 10-2016-0001103 (4 pages in English; 4 pages in Korean).

Korean Office Action issued on Mar. 15, 2017 in counterpart Korean Application No. 10-2016-0001103 (2 pages in English; 3 pages in Korean).

Korean Notice of Patent Grant issued on Apr. 28, 2017 in coupterpart Korean Application No. 10-2016-0001103 (2 pages in English; 3 pages in Korean).

* cited by examiner

APPARATUS AND METHOD FOR REQUESTING AND TRANSFERRING CONTENTS

CROSS-REFERENCE TO RELATED APPLICATION(S)

This application is a division of application Ser. No. 12/819,669 filed on Jun. 21, 2010, now U.S. Pat. No. 8,819,167 issued on Aug. 26, 2014, and claims the benefit under 35 USC 119(a) of Korean Patent Application No. 10-2009-0065995 filed on Jul. 20, 2009, the disclosure of which is incorporated by reference herein in its entirety for all purposes.

BACKGROUND

1. Field

The following description relates to a contents sharing system, and more particularly, to an apparatus and method that enables a user to effectively share contents.

2. Description of the Related Art

Recently, many studies have been undertaken to connect computers, various sensors, and various electronic devices to one another in a wireless scheme to ensure convenient and useful services. As an example, wireless communication protocol technologies such as Bluetooth, UWB, Zigbee, Z-Wave, and Wi-Fi have been rapidly developed for wireless connection and communication among electronic devices.

However, in order to share contents between electronic devices, many user manipulated steps are required. For example, when sharing phone books or photos between Bluetooth devices, first, a user starts a Bluetooth mode and searches for a communicable device to select a device for connection. After the connection has been made with the device, the user needs to retrieve and select an available service and enter a password, and as such use of service is complicated.

SUMMARY

Accordingly, in one aspect, there is provided an apparatus and method for requesting contents and an apparatus and method for transferring contents, capable of sharing contents such as data and applications between devices through wireless communication based on user input related to manual operation of a camera.

In one general aspect, there is provided a content requesting apparatus including a user interface unit, a control unit and a communication unit. The user interface unit generates an image capture event, which instructs an image capture to be performed, according to a user input. The control unit obtains address information of a content transferring apparatus according to the image capture event and generates a content requesting message including the address information. The communication unit transfers the generated content requesting message to the content transferring apparatus.

The content requesting apparatus further includes a photographing unit to capture an image according to the image capture event. The control unit obtains the address information of the content transferring apparatus by analyzing the captured image.

The content requesting apparatus further includes a device information storage unit to store at least one identification information used to identify the content transferring apparatus and address information of the content transferring apparatus. The control unit extracts identification information of the content transferring apparatus from the image, retrieves identification information corresponding to the extracted identification information from the stored identification information and obtains address information corresponding to the retrieved identification information.

The identification information used to identify the content transferring apparatus is at least one piece of image information about the content transferring apparatus.

The control unit further includes a radio frequency identification (RFID) reader, and the RFID reader obtains the address information of the content transferring apparatus from a radio frequency identification (RFID) tag attached to the content transferring apparatus.

The communication unit receives a response message including content and status information of the content from the content transferring apparatus, and the control unit obtains the content and status information from the response message.

The content included in the response message includes at least one of at least one application executed in the content transferring apparatus and at least one piece of data being reproduced in the application.

The content requesting apparatus further includes a storage unit, and the control unit stores the content and status information in the storage unit.

The control unit reflects the status information in the content to restore a status of content which has been executed on the content transferring apparatus.

The content requesting apparatus is a mobile terminal.

In another general aspect, there is provided a content transferring apparatus including a communication unit and a control unit. The communication unit receives a content requesting message from a content requesting apparatus. The control unit obtains a content and status information of the content according to the content requesting message and generates a response message including the obtained content and status information. The communication unit transfers the response message to the content requesting apparatus.

The control unit determines whether the content requesting apparatus has an authority to access the content, and generates the response message if the content requesting apparatus has the authority to access the content.

In another general aspect, there is provided a method of operating a content requesting apparatus. The method is as follows. First, address information of a content transferring apparatus is obtained according to an image capture event which instructs an image capture to be performed. Then, a content requesting message including the address information is generated. Finally, the generated content requesting message is transferred to the content transferring apparatus. In addition, a response message that includes a content and status information of the content is received from the content transferring apparatus. The content and status information are obtained from the response message.

In another general aspect, there is provided a method of operating a content transferring apparatus. The method is as follows. A content requesting message is received from a content requesting apparatus. Content and status information of the content are obtained according to the content requesting message. A response message including the obtained content and status information is generated. The response message is transferred to the content requesting apparatus.

Other features and aspects will become apparent to those skilled in the art from the following detailed description, the drawings, and the claims.

BRIEF DESCRIPTION OF THE DRAWINGS

Elements, features, and structures are denoted by the same reference numerals throughout the drawings and the detailed description, and the relative size and proportions of some elements may be exaggerated in the drawings for clarity, illustration, and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Descriptions of well-known functions and structures may be omitted for enhanced clarity and conciseness.

Figure 1:
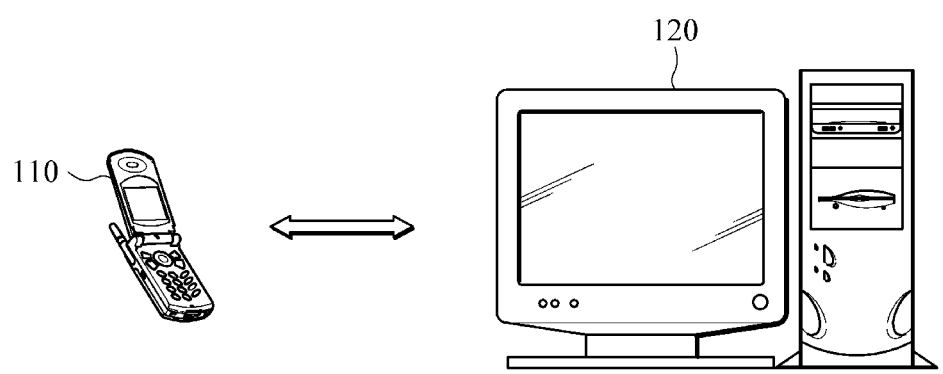
FIG. 1 is a view illustrating an example content delivery environment between devices.

FIG. 1 is a view illustrating an example content delivery environment between devices.

An example content delivery environment between devices includes a content requesting apparatus 110 and a content transferring apparatus 120. The content requesting apparatus 110 and the content transferring apparatus 120 may be different kinds of devices. The content requesting apparatus 110 is a device that requests the content transferring apparatus 120 to provide a content and receives the requested content. The content request apparatus 110 may be configured to transfer a content to another apparatus. Similarly, the content transferring apparatus 120 is a device that receives a request for content transferring from the content requesting apparatus 110 and transfers a content to the content requesting apparatus 110, but may be configured to receive a content from another apparatus.

In FIG. 1, a mobile phone is shown as an example of the content requesting apparatus 110, but the content requesting apparatus 110 may be provided in various forms having functions of a camera, such as personal digital assistants (PDAs), portable multimedia players (PMPs) and MPEG audio-layer 3 (MP3) players. In addition, in FIG. 1, a computer is shown as an example of the content transferring apparatus 120, but the content transferring apparatus 120 may be provided in various forms of electronic devices connected to a display apparatus or including a display apparatus. The content transferring apparatus 120 may manage at least one content provided on a display apparatus.

The content requesting apparatus 110 and the content transferring apparatus 120 are determined based on a relative concept among devices. In FIG. 1, a mobile phone represents the content requesting apparatus 100 and the computer represents the content transferring apparatus 120. However, a computer having a camera function may serve as the content requesting apparatus.

The content transferring apparatus 120 may transfer a content to the content requesting apparatus 110 according to a request of the content requesting apparatus 110. The content may be an application in execution and data being reproduced or running on the application. In addition, the content may further include status information about each of the application and the data. For example, if the application in execution is a moving picture reproducing program, the content may include the moving picture reproducing program and a moving picture file reproduced in the moving picture player program, and the status information may include a volume status and information about playback time and the like. In addition, if the application in execution is a document editing program, the content may include the document editing program and a document file running on the document editing program, and the status information may be location information about a cursor on a screen and the like.

When a content desired by a user is executed in the content transferring apparatus 120, the user captures an image of a display screen of the content transferring apparatus 120 by use of the camera function of the content requesting apparatus 110. The content requesting apparatus 110 processes the captured image, thereby obtaining address information of the content transferring apparatus 120. After that, the content requesting apparatus 110 generates a content requesting message for content sharing by use of the obtained information, and automatically sets a communication module for communication with the content transferring apparatus 120. For example, the content requesting apparatus 110 sets an available wireless communication protocol to establish a connection with the content transferring apparatus 120 and transfers the content requesting message to the content transferring apparatus 120.

Upon reception of the content requesting message, the content transferring apparatus 120 generates a response message including a content and status information about the content and transfers the response message.

The content included in the response message may be configured in various forms in the response message. As an example, if a plurality of contents are being executed in the content transferring apparatus 120, one of the contents executed on the front end of a display apparatus may be included in the response message. As another example, all of the contents in execution in the content transferring apparatus 120 may be included as in the response message. As another example, only application or one piece of data is included as a content in the response message. Alternatively, the contents included in the response message may be selected in various forms.

The above description has been made such that the content requesting apparatus 110 captures an image of the content transferring apparatus 120 and obtains address information of the content transferring apparatus 120 by use of the captured image. However, address information of the content transferring apparatus 110 may be obtained through a different method. For example, the content requesting apparatus 110 may obtain the address information of the content transferring apparatus 120 by performing RF communication with the content transferring apparatus 120.

In detail, in the case that the content transferring apparatus 120 has a radio frequency identification (RFID) tag including address information of the content transferring apparatus 120, and the content requesting apparatus 110 includes an RFID reader (not shown), as the user moves the RFID reader to the RFID tag of the content transferring apparatus 120, the content requesting apparatus 110 obtains the address information of the content transferring apparatus 120 through RF communication.

In addition, the above description has been made such that the content requesting apparatus 110 generates the content requesting message by use of the address information of the content transferring apparatus 120 that is disposed within a range in which the content requesting apparatus 110 captures the image of the content transferring apparatus 120. However, the content requesting apparatus 110 may not obtain the address information of the content transferring apparatus 120, but may obtain URL information of another remote second content transferring apparatus which is capable of storing and transferring the content in execution in the content transferring apparatus 120.

In this case, the content requesting apparatus 110 may generate a content requesting message by use of the URL information and transfers the generated content requesting message to the second content transferring apparatus. The second content transferring apparatus having received the content requesting message from the content requesting apparatus 110 generates a response message according to the content requesting message and transfers the generated response message to the content requesting apparatus 110.

The content requesting apparatus 110 receives the response message and operates based on a preset content sharing operation mode. The content sharing operation mode may include a content storing mode and a mode in which firstly storage is performed and then execution is performed (hereinafter referred to as "storage-and-execution mode"). The user may preset the content sharing operation mode of the content requesting apparatus 110 into the content storage mode or the storage-and-execution mode.

In the case of the content storage mode, the content requesting apparatus 110 stores a received content and status information about the received content. In the case of the content storage-and-execution mode, the content requesting apparatus 110 launches an application for reproducing the content included in the response message and reproduces the corresponding content and status information. In this case, the content requesting apparatus 110 reflects the status information in the content, thereby generating the same screen as that being executed in the content transferring apparatus 120 and providing a user to the screen.

The above description has been made in that the content transferring apparatus 120 sends any one selected from the contents being executed in the response message. However, the content transferring apparatus 120 may send preset additional content in addition to the contents being executed. For example, when the content transferring apparatus 120 reproduces an advertisement moving picture content, if the content transferring apparatus 120 receives a content requesting message from the content requesting apparatus 110, the content transferring apparatus 120 may transfer a discount coupon, information about advertised merchandise, and the location of stores in addition to the advertisement moving picture content, thereby promoting the advertisement effect.

Personal information such as ages or genders of the user is additionally transferred through the content requesting message from the content requesting apparatus 110, the content transferring apparatus 120 may transfer a content customized based on the received personal information to the content requesting apparatus 110. For example, in the case that the content transferring apparatus 120 provides advertisement contents, the content transferring apparatus 120 provides a customized advertisement based on personal information received from the content requesting apparatus 110.

As described above, the transfer and execution of contents between devices is performed by only capturing the image using a camera of the content requesting apparatus 110. Accordingly, the steps required for wireless communication are simplified and various kinds of service can be provided to the user in an easy manner.

Figure 2:
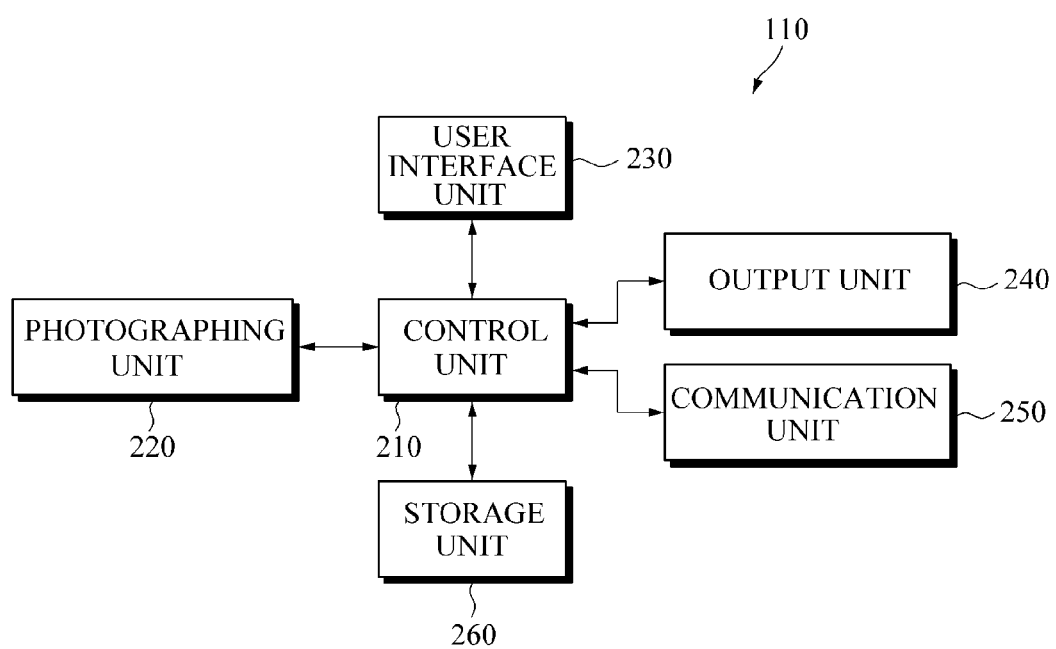
FIG. 2 is a view illustrating an example content requesting apparatus making a request for content.

FIG. 2 is a view illustrating an example content requesting apparatus making a request for contents.

The content requesting apparatus 110 includes a control unit 210, a photographing unit 220, a user interface unit 230, an output unit 240, a communication unit 250 and a storage unit 260.

The control unit 210 controls the photographing unit 220, the user interface unit 230, the output unit 240, the communication unit 250 and the storage unit 260, thereby controlling the overall operation of the content requesting apparatus 110. The control unit 210 may include an image processor for processing an image captured by the photographing unit 220.

Upon reception of an image capture event, the control unit 210 obtains address information of the content transferring apparatus 120, and generates a content requesting message including the address information. When obtaining address information of the content transferring apparatus 120, the control unit 210 uses an object extraction method to extract address information of the content transferring apparatus 120 from an image captured in response to an input of the image capture event.

The content transferring apparatus 120 may be an apparatus included in the captured image, or may not be included in the captured image but practically manages a content to generate a response message. If an apparatus included in the captured image is the content transferring apparatus 120, which transfers the response message to the content requesting apparatus 110, the content requesting apparatus 110 identifies the content transferring apparatus 120 through image processing to obtain address information of the content transferring apparatus 120.

The photographing unit 220 includes a lens, a charge coupled device (CCD) image sensor, a complementary metal oxide semiconductor (CMOS) image sensor and an analog digital converter. The photographing unit 220 obtains an image signal, which is generated by capturing a subject, and converts the obtained image signal into a digital signal. After that, the photographing unit 220 transmits the digital signal to the control unit 210. The control unit 210 may perform an image processing for identifying the content transferring apparatus 120 by applying an object extraction method to an image converted in the form of a digital signal.

The user interface unit 230 may receive various kinds of user input signals through a keypad and a touch pad, and transfers the user input signal to the control unit 210. The user interface unit 230 may include various kinds of function keys such as a photographing button, a camera operation mode button and a photographing mode selection button. The user interface unit 230 generates an image capture event which instructs an image capture according to an input through a user input key.

The image capture event is not only configured to photograph an image but also to receive a content, which is executed in a captured image of scene, from another device. The user interface unit 230 may additionally include a button to generate an example image capture event. The user input signal input through the user interface unit 230 is transmitted to the control unit 210 such that an operation according to the user input signal is performed.

The output unit 240 may include a display apparatus (not shown) such as a color liquid crystal display and an audio outputting apparatus (not shown). During a standby mode, the display apparatus of the output unit 240 may display an image of a subject, which is being captured by the photographing unit 120, according to the control of the control unit 210.

The communication unit 250 performs communication with an external device. The communication unit 250 operates based on at least one communication protocol. The communication unit 250 manages a network connection with respect to the content transferring apparatus 120 according to a preset communication protocol. In addition, the communication unit 250 transfers a content requesting message generated from the control unit 210 to the content transferring apparatus 120, receives a response message from the content transferring apparatus 120 through the preset communication protocol and transfers the received response message to the control unit 210.

The image processed in the control unit 210 is stored in the storage unit 260. The storage unit 260 is detachably connected to the outside or inside of the content requesting apparatus 110. The storage unit 260 stores a content extracted from the response message and status information of the extracted content.

Figure 3:
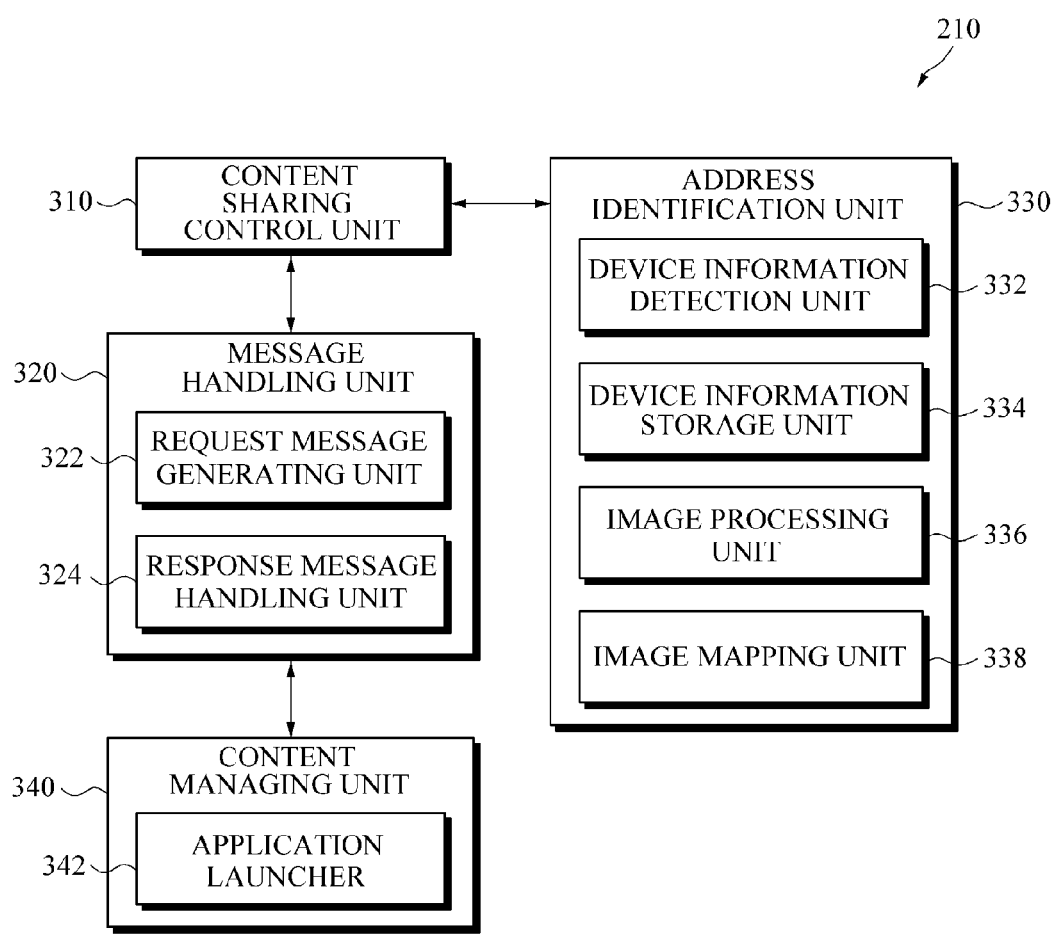
FIG. 3 is a view illustrating a control unit of the content requesting apparatus shown in FIG. 2.

FIG. 3 is a view illustrating a control unit of the content requesting apparatus shown in FIG. 2.

As shown in FIG. 3, the control unit 210 may include a content sharing control unit 310, a message handling unit 320, an address identification unit 330 and a content managing unit 340.

Hereinafter, the content sharing control unit 310, the message handling unit 320 and the address identification unit 330 of the content requesting apparatus 110 will be described which serve to generate a content requesting message.

The content sharing control unit 310 initiates a content sharing requesting process with the content transferring apparatus 120. The content sharing control unit 310 may be activated when an image capture event occurs. The image capture event may occur when a button for image capturing in the content requesting apparatus 110 is pressed. Alternatively, the image capture event may be generated when a preset additional button is pressed.

The message handling unit 320 may include a request message generating unit 322 and a response message handling unit 324. The request message generating unit 322 may generate a content requesting message, which requests for content sharing, conforming to a predetermined communication protocol.

The content requesting message may include message type information indicating its type, information about an address of the content requesting apparatus 110 to receive a response message and information about an address of the content transferring apparatus 120 to transfer the content requesting message. The address of the content transferring apparatus 120 may be obtained through the address identification unit 330. In addition, the content requesting message may further include a device capability based on standards of the content requesting apparatus 110 and information about an authority allowing access to contents.

The address identification unit 330 may identify an address of the content transferring apparatus 120 through various methods. The address identification unit 330 determines and selects a predetermined method available in a current situation, thereby obtaining the address of the content transferring apparatus 120.

The address identification unit 330 may include a device information detection unit 332, a device information storage unit 334, an image processing unit 336 and an image mapping unit 338.

The device information detection unit 332 may control an operation of the device information storage unit 334, the image processing unit 336 and the image mapping unit 338 to obtain address information of the content transferring apparatus 120.

The device information detection unit 332 may identify the content transferring apparatus 120 and obtains address information about the content transferring apparatus 120 by reading identification information, such as a barcode and an RFID tag, attachable to the content transferring apparatus 120. For example, if the device information detection unit 332 includes an RFID reader, the address information of the content transferring apparatus 120 may be obtained from an RFID tag which is attached to the content transferring apparatus 120 and stores the address information of the content transferring apparatus 120.

In detail, in the case that an RFID tag including address information of the content transferring apparatus 120 is attached to the content transferring apparatus 120 and the content requesting apparatus 110 includes an RFID reader, if a user moves the content requesting apparatus 110 to the content transferring apparatus 120 so that the RFID reader of the content requesting apparatus 110 is adjacent to the RFID tag of the content transferring apparatus 120, the content requesting apparatus 110 obtains the address information of the content transferring apparatus 120 through RF communication.

The device information storage unit 334 may store identification information used to identify the content transferring apparatus 120 and address information of the content transferring apparatus 120. The identification information of the content transferring apparatus 120 may be at least one image obtained by photographing the external appearance of the content transferring apparatus 120. In addition, the device information storage unit 334 may further store protocol information available for different content transferring apparatuses in addition to the identification information. Although it is shown in the drawing that the device information storage unit 334 is included in the control unit 21, the location of the device information storage unit 334 is not limited thereto.

The image processing unit 336 extracts an external image of the content transferring apparatus 120 from the image captured by the image capture event. The image mapping unit 338 performs an image comparison in which at least two images are compared to each other, thereby determining two images having a similarity.

Hereinafter, the obtaining of an address of the content transferring apparatus 120 will be described in which the device information detection unit 332 obtains the address of the content transferring apparatus 120 by use of a captured image.

As an example, the device information detection unit 332 controls the image processing unit 336 to extract identification information of the content transferring apparatus 120, for example, the serial number of the content transferring apparatus 120 from captured images by use of a generally known object extraction algorithm. After the identification information of the content transferring apparatus 120 has been extracted, the device information detection unit 332 retrieves identification information corresponding to the extracted identification information among a plurality of pieces of identification information which correspond to different content transferring apparatuses and are stored in the device information storage unit 334. Then, the device information detection unit 332 obtains address information corresponding to the identification information retrieved from the device information storage unit 334.

As another example, the device information detection unit 332 controls the image processing unit 336 to extract an image of the content transferring apparatus 120 from the captured images by use of a generally known object extraction algorithm. After the image of the content transferring apparatus 120 has been extracted, the device information detection unit 332 retrieves an image corresponding to the extracted image from one or more images which identify different content transferring apparatuses and are stored in the device information storage unit 334. In order to retrieve an image corresponding to the extracted image, the device information detection unit 332 controls the image mapping unit 338 to compare the extracted image with images stored in the device information storage unit 334 so that an image corresponding to the extracted image is output from the images stored in the device information storage unit 334. The device information detection unit 332 obtains address information of the content transferring apparatus 120 corresponding to the image output from the device information storage unit 334.

As another example, if an image of the content transferring apparatus 120 includes image information indicating the address of the content transferring apparatus 120, the device information detection unit 332 controls the image processing unit 336 to process the captured image and obtain the address of the content transferring apparatus 120.

In FIG. 3, although it is shown that an image processing engine such as the image processing unit 336 and the image mapping unit 338 is included in the content requesting apparatus 110, the content requesting apparatus 110 may not include the image processing engine, but may receive a requested image processing result through a cloud computing service including the image processing engine.

Hereinafter, components of the content requesting apparatus 110 will be described in relation to operations of the content requesting apparatus 110 when receiving a response message, including a content, and status information about the content from the content transferring apparatus 120.

After a content requesting message has been transferred, the response message handling unit 324 waits for a response to the content requesting message from the content transferring apparatus 120. In response to the response message, the response message handling unit 324 allows the content managing unit 340 to initiate a content sharing process.

The response message handling unit 324 analyzes the response message to provide the content managing unit 340 with information used to process contents, that is, provide the content managing unit 340 with a content and status information about the content. The content may include application, at least one data executed in an application, and status information about the received content. The status information includes at least one of information indicating a setting status of the application and information indicating a status of data reproduced in the application. For example, in the case that the application is a moving picture reproducing program, the status information may include volume levels, screen settings and playback time information of a moving picture being reproduced.

The content managing unit 340 processes a received content according to a preset mode. In the case that a content sharing operation is set as a storage mode, the content managing unit 340 stores the received content in a predetermined location of the storage unit 260.

In the case that a content sharing operation is set as an storage-and-execution mode, the content managing unit 340 stores the received content in a predetermined location of the storage unit 260 and then executes the content. In order to execute the content, the content managing unit 340 may execute an application such as a media display or an office program capable of executing data included in a response message. The executed application to execute the data may be preinstalled in the content requesting apparatus 110, or included in a response message transferred from the content transferring apparatus 120. The content managing unit 340 uses the status information received from the response message handling unit 324 such that the application is executed in the same state as that in the content transferring apparatus 120. The content managing unit 340 runs an application in the content requesting apparatus 110 by use of an application launcher 342 that processes application related operations.

The content managing unit 340 reflects status information in the content, thereby restoring a content to the same condition as that of the content reproduced in the content requesting apparatus 110.

Accordingly, the user views an application screen identical to that shown in the content transferring apparatus 120. In addition, a process or content, which has been implemented in the content transferring apparatus 120, is continuously reproduced in the transferring apparatus 120.

Figure 4:
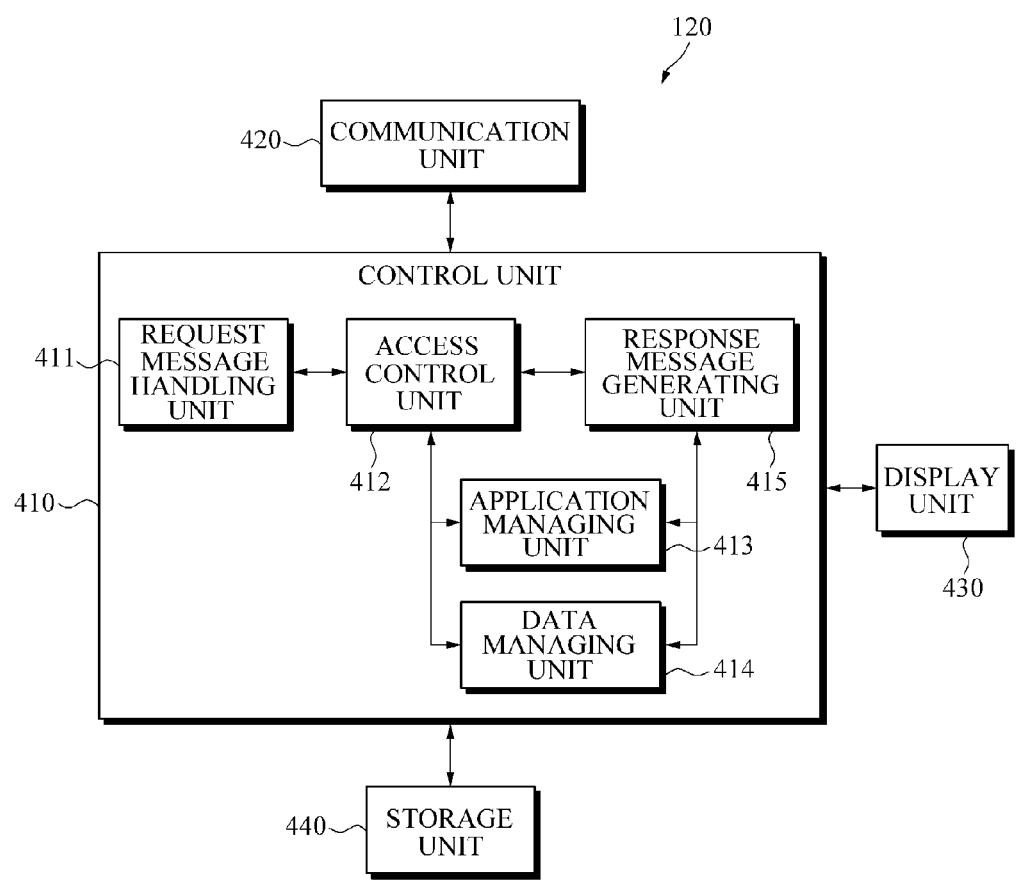
FIG. 4 is a view illustrating an example content transferring apparatus transferring contents according to a request for content transferring.

FIG. 4 is a view illustrating an example content transferring apparatus transferring contents according to a request for content transferring.

As shown in FIG. 4, the content transferring apparatus 120 may include a control unit 410, a communication unit 420, a display unit 430 and a storage unit 440. The display unit 430 may display a content execution screen controlled according to the control unit 410. The display unit 430 may be connected to the exterior of the content transferring apparatus 120. The communication unit 420 performs communication with another electronic device. The storage unit 440 stores a content including an application and data executed in the application along a predetermined path.

The control unit 410 controls the overall operation of the content transferring apparatus 120. The control 410 may include a request message handling unit 411, an access control unit 412, an application managing unit 413, a data managing unit 414, and a response message generating unit 415.

The request message handling unit 411 waits for a content sharing request from another device and handles the content requesting message.

The access control unit 412 checks whether the content requesting apparatus 110 has an authority allowing access to a content. If the content access authority of the content requesting apparatus 110 is ensured, the access control unit 412 allows the response message generating unit 415 to configure a response message. In the case that the content requesting message includes information about the content access authority, the access control unit 412 may check the content access authority by use of information about content access authority that is obtained by parsing the content requesting message. In the case that a plurality of pieces of content access authority information for different content requesting apparatuses are stored in the content transferring apparatus 120, the access control unit 412 may check the content access authority by use of the stored information.

The application managing unit 413 manages execution of applications in the content transferring apparatus 120. The application managing unit 412 manages a list and status information of applications currently being executed. The application managing unit 413 provides the response message generating unit 415 with applications and status information about the applications, for example, an identifier of the application, a current status of the application and an identifier of data currently being reproduced.

The data managing unit 414 manages data that is reproduced through applications in the content transferring apparatus 120. The data managing unit 414 searches for an access path on requested data to fetch corresponding data and status information about the data and provides the data and status information to the response message generating unit 415.

The response message generating unit 415 generates a response message by use of the content and status information about the content that are provided from the application managing unit 413 and the data managing unit 414. The content included in the response message may be at least one of an application and data executed in the application. The application may include an application installation file. The generated response message is transferred to the content requesting apparatus 110 through the communication unit 420.

Figure 5:
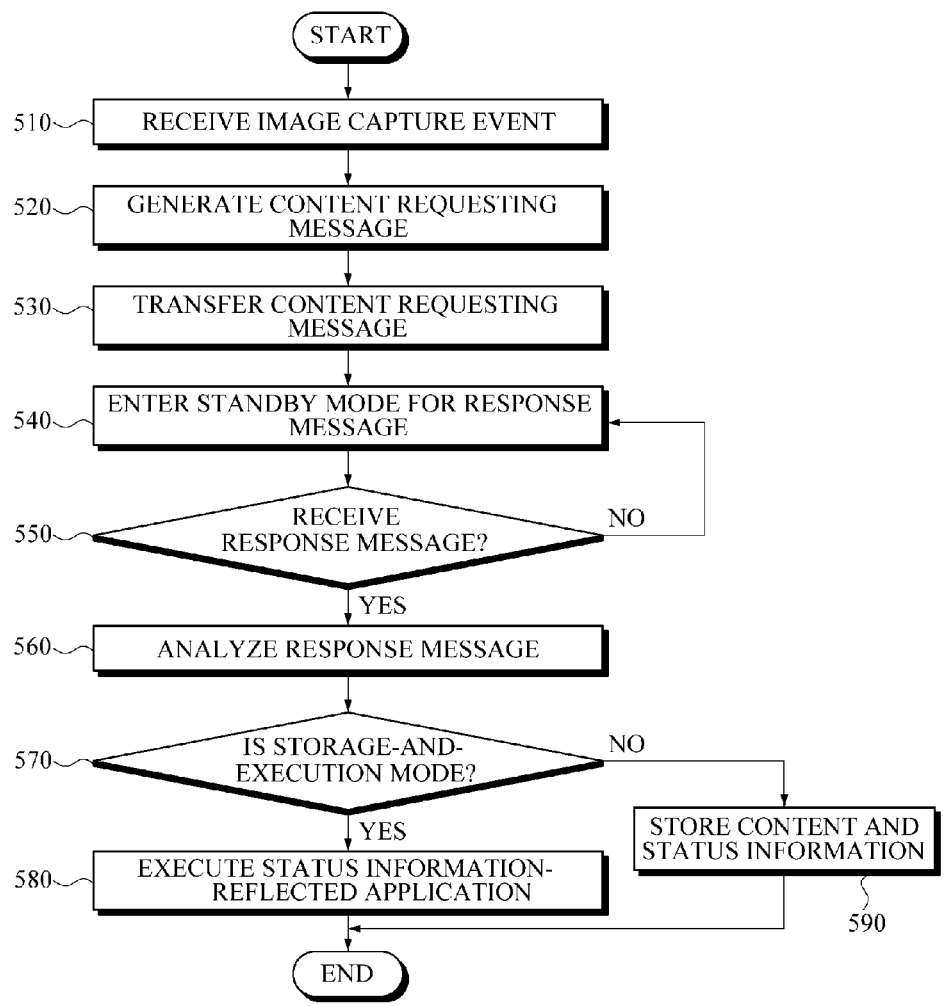
FIG. 5 is a view showing an example operation of the content requesting apparatus.

FIG. 5 is a view showing an example operation of the content requesting apparatus.

The content requesting apparatus 110 receives an image capture event which is generated according to a user input instructing an image capture (operation 510). According to the received image capture event, the content requesting apparatus 110 captures an image to obtain address information of the content transferring apparatus 120 and generates a content requesting message including the address information (operation 520).

The content requesting apparatus 110 transfers the content requesting message to the content transferring apparatus (operation 530) and enters a standby state for a response message (operation 540).

If the content requesting apparatus 110 receives a response message including a content and status information about the content from the content transferring apparatus 120 (operation 550), the content requesting apparatus 110 analyzes the response message to obtain a content and status information about the content (operation 560).

The content requesting apparatus 110 checks the preset operation mode and operates according to the operation mode. If the operation mode is in a storage-and-execution mode (operation 570), the content requesting apparatus 120 reflects the status information in the content, thereby restoring a content to the same state as that of the content being executed in the content transferring apparatus 120, and providing the user with the restored content (operation 580). If the operation mode is in a storage mode, the content requesting apparatus 110 stores the content and the status information (operation 590).

Figure 6:
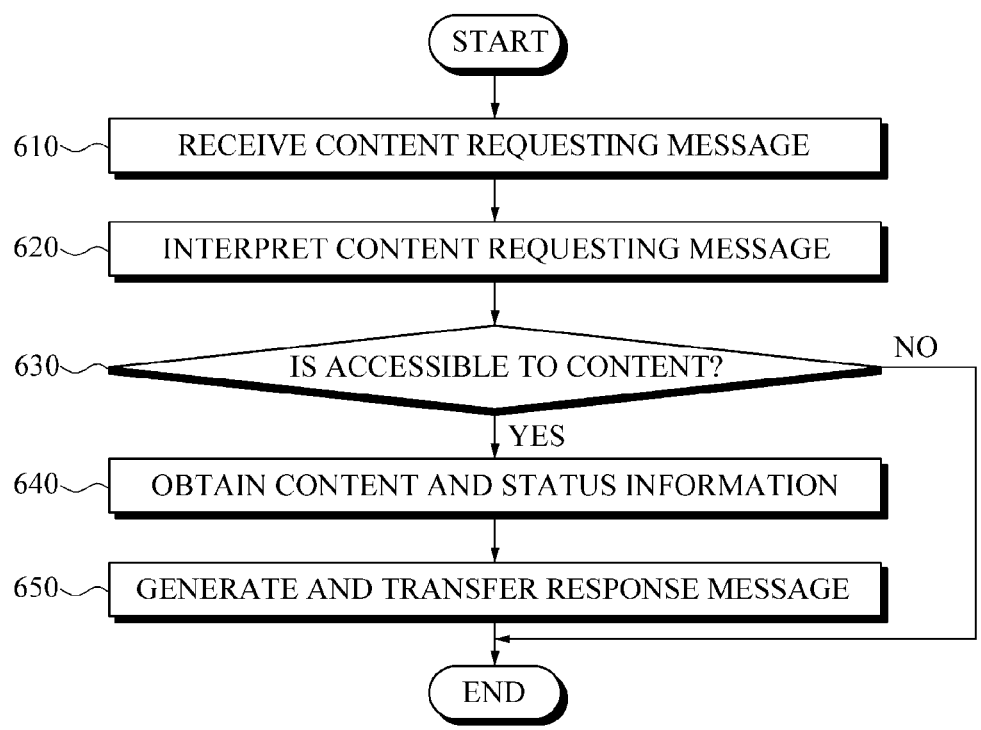
FIG. 6 is a view showing an example operation of the content transferring apparatus.

FIG. 6 is a view showing an example operation of the content transferring apparatus.

The content transferring apparatus 120 receives a content requesting message (operation 610) and interprets the received content requesting message (operation 620).

The content transferring apparatus 120 handles the content requesting message to check if the content requesting apparatus 110 is capable of accessing the content (operation 630). If it is verified that the content requesting apparatus 110 has accessibility to the content, the content transferring apparatus 120 obtains a content and status information about the content that are to be transferred to the content requesting apparatus 120 according to the content requesting message (operation 640). The content transferring apparatus 120 generates a response message including the obtained content and status information, and transfers the generated response message to the content requesting apparatus 110 (operation 650).

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An electronic device comprising:
   at least one transceiver configured to receive, from a target electronic device, a request message for requesting data via a path for pairing between the electronic device and the target electronic device; and
   at least one processor configured to:
      generate a response message comprising information regarding the requested data; and
      transmit the response message to the target electronic device via the path,
      wherein the path has been established based on identification information for identifying the electronic device, and
      wherein the identification information is obtained from an image of the electronic device captured by the target electronic device.

2. The electronic device of claim 1, wherein the at least one processor is further configured to include predetermined additional data in the response message.

3. The electronic device of claim 1, wherein the at least one processor is further configured to include additional data related to the requested data in the response message.

4. The electronic device of claim 1, wherein the request message comprises personal information for a user of the electronic device, and
wherein the at least one processor is further configured to include additional data customized based on the personal information of the user in the response message.

5. The electronic device of claim 1, further comprising a display apparatus;
wherein the requested data comprises content displayed on the display apparatus; and
wherein the at least one processor is further configured to include the displayed content in the response message to enable the target electronic device to display the displayed content on a display apparatus of the target electronic device.

6. The electronic device of claim 5, wherein the at least one processor is further configured to include status information of the displayed content in the response message to enable the target electronic device to display the received content on the display apparatus of the target electronic device according to the status information.

7. The electronic device of claim 1, wherein the requested data comprises application data for an application being executed in the electronic device; and
wherein the at least one processor is further configured to include the application data in the response message to enable the target electronic device to execute the application data in the application in the target electronic device.

8. The electronic device of claim 7, wherein the at least one processor is further configured to include information for installing the application in the target electronic device.

9. The electronic device of claim 1, wherein the at least one processor is further configured to:
determine whether the target electronic device is authorized to access the data; and
generate the response message in response to the target electronic device being authorized to access the content.

10. The electronic device of claim 1, wherein the electronic device comprises a television.

11. The electronic device of claim 1, wherein the identification information indicates an address of the target electronic device, and
wherein the path has been established based on the address of the target electronic device.

12. The electronic device of claim 1, wherein the identification information is obtained by a radio frequency identification (RFID) for the electronic device identified by the target electronic device.

13. The electronic device of claim 1, wherein the data comprises content being displayed on a display of the electronic device and status information of the content.

14. A method of operating an electronic device, the method comprising:
receiving, from a target electronic device, a request message for requesting data via a path for pairing between the electronic device and the target electronic device;
generating a response message comprising information regarding the requested data; and
transmitting the response message to the target electronic device via the path,
wherein the path has been established based on identification information for identifying the electronic device, and
wherein the identification information is obtained from an image of the electronic device captured by the target electronic device.

15. The method of claim 14, wherein the response message further comprises predetermined additional data.

16. The method of claim 14, wherein the response message further comprises additional data related to the requested data.

17. The method of claim 14, wherein the request message comprises personal information for a user of the electronic device, and
wherein the response message further comprises additional data customized based on the personal information for the user.

18. The method of claim 14, wherein the requested data comprises content displayed on a display apparatus of the electronic device, and
wherein the response message comprises the displayed content to enable the target electronic device to display the displayed content on a display apparatus of the target electronic device.

19. The method of claim 18, wherein the response message further comprises status information of the displayed content to enable the target electronic device to display the received content on the display apparatus of the target electronic device according to the status information.

20. The method of claim 14, wherein the requested data comprises application data for an application being executed in the electronic device, and
wherein the response message includes the application data to enable the target electronic device to execute the application data in the application in the target electronic device.

21. The method of claim 20, wherein the response message further comprises information for installing the application in the target electronic device.

22. The method of claim 14, wherein generating the response message comprises:
determining whether the target electronic device is authorized to access the data; and
generating the response message in response to the target electronic device being authorized to access the content.

23. The method of claim 14, wherein the electronic device comprises a television.

24. The method of claim 14, wherein the identification information indicates an address of the target electronic device, and
wherein the path has been established based on the address of the target electronic device.

25. The method of claim 14, wherein the identification information is obtained by a radio frequency identification (RFID) for the electronic device identified by the target electronic device.

26. The method of claim 14, wherein the data comprises content being displayed on a display of the electronic device and status information of the content.

* * * * *